United States Patent
Takada et al.

(10) Patent No.: US 8,432,125 B2
(45) Date of Patent: Apr. 30, 2013

(54) NON-CONTACT POWER TRANSMISSION APPARATUS

(75) Inventors: Kazuyoshi Takada, Aichi-ken (JP);
 Shimpei Sakoda, Aichi-ken (JP);
 Sadanori Suzuki, Kariya (JP); Kenichi Nakata, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 591 days.

(21) Appl. No.: 12/702,112

(22) Filed: Feb. 8, 2010

(65) Prior Publication Data
 US 2010/0201316 A1 Aug. 12, 2010

(30) Foreign Application Priority Data
 Feb. 9, 2009 (JP) ................................. 2009-027670

(51) Int. Cl.
 *H02J 7/04* (2006.01)
 *G01N 27/42* (2006.01)
 *G01N 27/416* (2006.01)

(52) U.S. Cl.
 USPC ........... 320/104; 320/108; 320/107; 320/109; 324/430; 324/433

(58) Field of Classification Search .................. 320/108, 320/109, 104, 107; 307/104; 191/10; 180/2.1; 324/425, 426, 427, 428, 429, 430, 433
 See application file for complete search history.

(56) References Cited

U.S. PATENT DOCUMENTS

| | | | | |
|---|---|---|---|---|
| 7,986,059 B2 * | 7/2011 | Randall | | 307/104 |
| 2006/0219448 A1 * | 10/2006 | Grieve et al. | | 180/65.3 |
| 2007/0222542 A1 * | 9/2007 | Joannopoulos et al. | | 333/219 |
| 2008/0197804 A1 * | 8/2008 | Onishi et al. | | 320/108 |
| 2008/0278264 A1 | 11/2008 | Karalis | | |

(Continued)

FOREIGN PATENT DOCUMENTS

| | | |
|---|---|---|
| WO | WO2007/008646 A2 | 1/2007 |
| WO | WO2008/118178 A1 | 6/2007 |
| WO | WO2009/054221 A1 | 4/2009 |

OTHER PUBLICATIONS

Soljacic, et al., "*Nikkei Electronics*", Dec. 3, 2007, 966, 117-128.

(Continued)

*Primary Examiner* — Edward Tso
*Assistant Examiner* — Alexis Boateng
(74) *Attorney, Agent, or Firm* — Woodcock Washburn LLP (57) ABSTRACT

A non-contact power transmission apparatus having an AC power source and a resonance system is disclosed. The resonance system has a primary coil connected to the AC power source, a primary side resonance coil, a secondary side resonance coil, a secondary coil, and a load connected to the secondary coil. The primary side resonance coil is separated from the primary coil in an axial direction by a first distance, and the secondary coil is separated from the secondary side resonance coil in the axial direction by a second distance. At least one of the first distance and the second distance is adjusted to be a distance that is determined in advance in accordance with the impedance of the load so that the power transmission efficiency is maintained at a proper value.

8 Claims, 5 Drawing Sheets

U.S. PATENT DOCUMENTS

| | | | |
|---|---|---|---|
| 2009/0039831 A1* | 2/2009 | Ichikawa | 320/118 |
| 2009/0153098 A1* | 6/2009 | Toya et al. | 320/108 |
| 2009/0224720 A1* | 9/2009 | Oyobe et al. | 318/801 |
| 2010/0026236 A1* | 2/2010 | Kamiyama et al. | 320/108 |
| 2010/0127659 A1* | 5/2010 | Klinghult | 320/108 |
| 2011/0074341 A1* | 3/2011 | Jensen et al. | 320/108 |
| 2012/0043172 A1* | 2/2012 | Ichikawa | 191/45 R |

OTHER PUBLICATIONS

"Wireless Power Transfer Via Strongly Coupled Magnetic Resonances" Science Magazine vol. 317, Jul. 6, 2007, p. 83-86.

* cited by examiner

NON-CONTACT POWER TRANSMISSION APPARATUS

CROSS REFERENCE TO RELATED APPLICATION

This application claims priority to Japanese Patent Application No. 2009-027670 filed Feb. 9, 2009.

BACKGROUND

The present invention relates to a non-contact power transmission apparatus.

Figure 8:
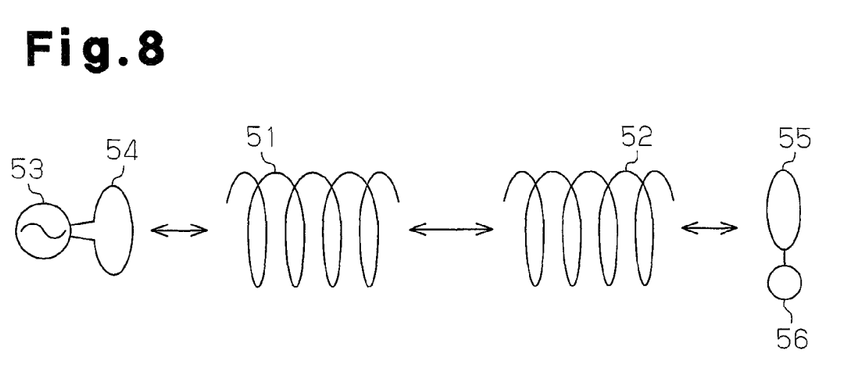
FIG. 8 is a diagram showing the configuration of a prior art non-contact power transmission apparatus.

FIG. 8 schematically shows a non-contact power transmission apparatus that wirelessly transmits power from a first copper wire coil 51 to a second copper wire coil 52, which is separated from the first copper wire coil 51, by using resonance of an electromagnetic field. Such an apparatus is disclosed, for example, in NIKKEI ELECTRONICS published on Dec. 3, 2007, pages 117 to 128 and International Patent Publication No. WO/2007/008646, In FIG. 8, a magnetic field generated at a primary coil 54 connected to an AC power source 53 is enhanced by magnetic field resonance by the first and second copper wire coils 51, 52, so that electrical power is generated at a secondary coil 55 through electromagnetic induction of the enhanced magnetic field of the second copper wire coil 52. The generated power is then supplied to a load 56. It has been observed that a 60-watt electric lamp, as the load 56, can be lit when first and second copper wire coils 51, 52 having a diameter of 30 cm are separated by 2 m.

To efficiently supply the output power of the AC power source 53 to the load 56 using the non-contact power transmission apparatus, it is necessary to supply the output power of the AC power source 53 to the resonance system (the first and second copper wire coils 51, 52 and the primary and secondary coils 54, 55). However, the above cited documents only disclose summaries of non-contact power transmission apparatuses, but do not specifically show what should be done to obtain a non-contact power transmission apparatus that satisfies the requirements.

When the distance between the first copper wire coil 51 on the transmission side and the second copper wire coil 52 on the reception side and the impedance of the load 56 are constant, a resonance frequency of the resonance system suitable for the impedance of the load 56 is obtained in advance by experiments. An AC voltage having the obtained resonance frequency is supplied from the AC power source 53 to the primary coil 54. However, when the impedance of the load 56 is changed, the power of the AC power source 53 cannot be efficiently supplied to the load 56. In this description, the resonance frequency of the resonance system refers to the frequency at which the power transmission efficiency is maximized.

SUMMARY

Accordingly, it is an objective of the present invention to provide a non-contact power transmission apparatus that is capable of transmitting power with proper efficiently without changing the frequency of the AC voltage of an AC power source even if the impedance of a load changes.

To achieve the foregoing objective and in accordance with one aspect of the present invention, a non-contact power transmission apparatus having an AC power source and a resonance system is provided. The resonance system has a primary coil connected to the AC power source, a primary side resonance coil, a secondary side resonance coil, a secondary coil, and a load connected to the secondary coil. The primary side resonance coil is separated from the primary coil in an axial direction by a first distance, and the secondary coil is separated from the secondary side resonance coil in the axial direction by a second distance. At least one of the first distance and the second distance is adjusted to be a distance that is determined in advance in accordance with the impedance of the load so that the power transmission efficiency is maintained at a proper value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF ILLUSTRATIVE EMBODIMENTS

A non-contact power transmission apparatus 10 according to a first embodiment of the present invention will now be described with reference to FIGS. 1 to 3.

Figure 1A:
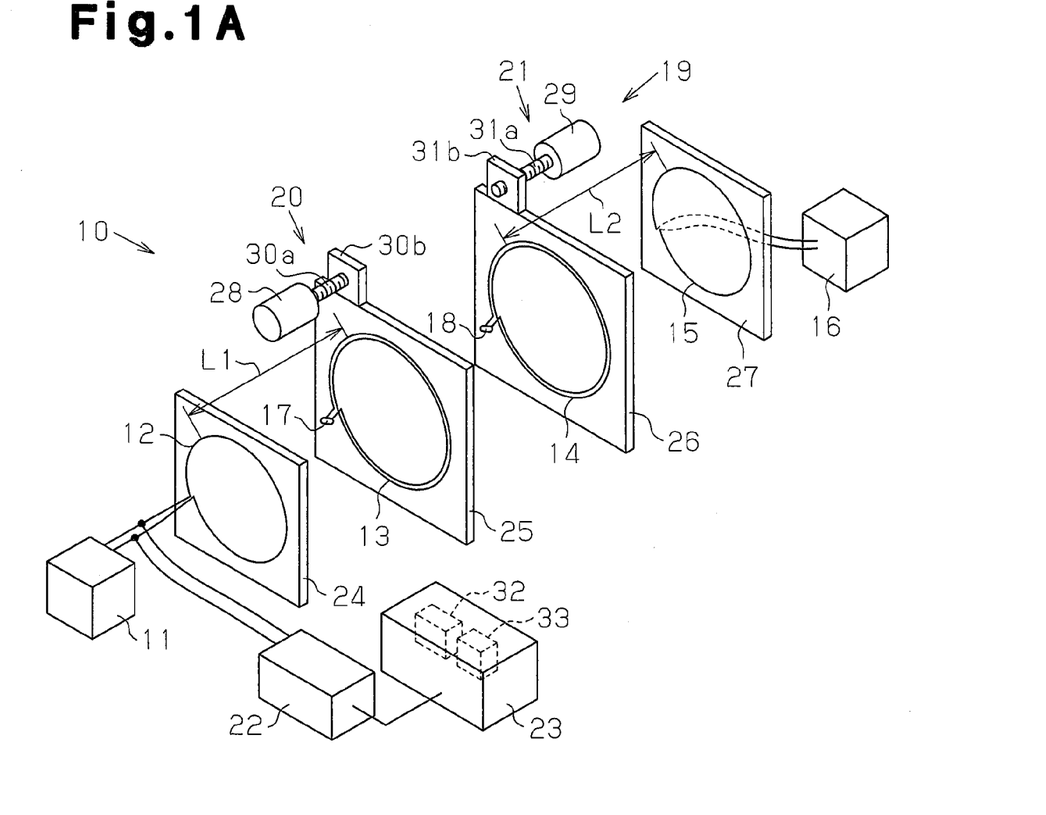
FIG. 1A is an exploded perspective view illustrating a non-contact power transmission apparatus according to a first embodiment of the present invention.
Figure 1B:
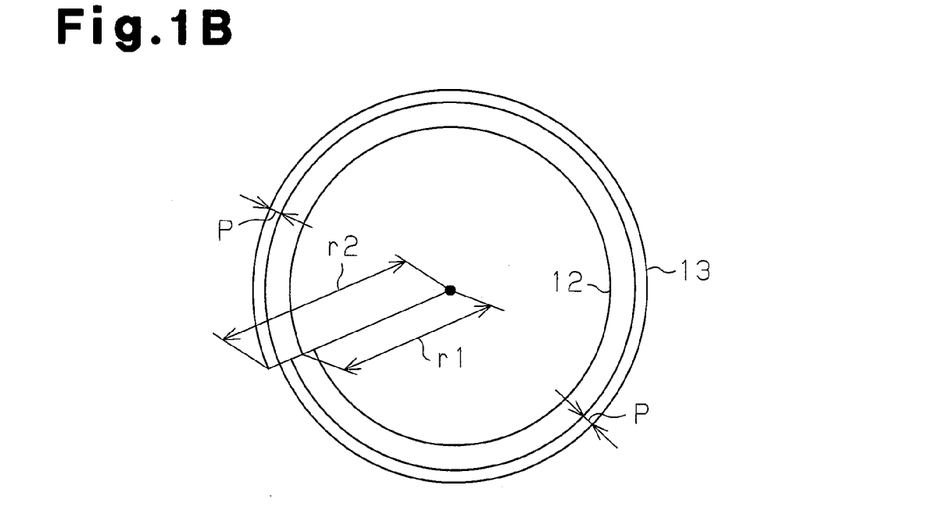
FIG. 1B is a diagram showing the relationship between the primary coil (secondary coil) and the primary side resonance coil (secondary side resonance coil)
Figure 2:
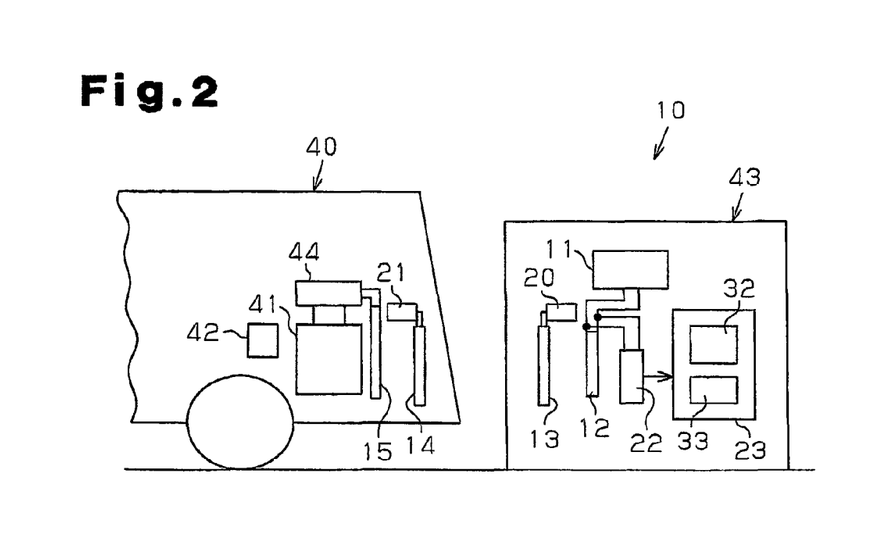
FIG. 2 is a diagram showing the relationship between a charging device and a movable body.

As shown in FIG. 1A, the non-contact power transmission apparatus 10 includes an AC power source 11, a primary coil 12 connected to the AC power source 11, a primary side resonance coil 13, a secondary side resonance coil 14, a secondary coil 15, and a load 16 connected to the secondary coil 15. A capacitor 17 is connected to the primary side resonance coil 13 in parallel, and a capacitor 18 is connected to the secondary side resonance coil 14 in parallel. The primary coil 12, the primary side resonance coil 13, the secondary side resonance coil 14, the secondary coil 15, the load 16, and the capacitors 17, 18 form a resonance system 19.

The primary coil 12, the primary side resonance coil 13, the secondary side resonance coil 14, and the secondary coil 15 are arranged coaxially. A first distance L1 between the primary coil 12 and the primary side resonance coil 13 along the axial direction and a second distance L2 between the secondary coil 15 and the secondary side resonance coil 14 along the axial direction are each variable. The non-contact power transmission apparatus 10 further includes a distance changing device 20 (distance changing section or first distance changing section) that changes the first distance L1, a distance changing device 21 (distance changing section or second distance changing section) that changes the second distance L2, an impedance measuring device 22 (impedance measuring section), and a controller 23. The impedance measuring device 22 measures the input impedance of the resonance system 19 (the impedance of the entire resonance system 19 measured at both ends of the primary coil 12). The controller 23 changes the distances L1, L2 by controlling the distance changing devices 20, 21 based on the measurement result of the impedance measuring device 22.

The AC power source 11 is a power source that supplies AC voltage to the primary coil 12. The frequency of the AC voltage of the AC power source 11 is set to a previously set resonance frequency of the resonance system 19. In this embodiment, the frequency of the AC voltage is set to a frequency that maximizes the power transmission efficiency when the impedance of the load 16 is 50Ω.

The primary coil 12, the primary side resonance coil 13, the secondary side resonance coil 14, and the secondary coil 15 are each shaped by spirally winding a wire in a single plane. In this embodiment, the primary coil 12 and the secondary coil 15 are formed to have substantially the same diameter. The primary side resonance coil 13 and the secondary side resonance coil 14 are formed to have substantially the same diameter. The diameters of the primary coil 12 and the secondary coil 15 are smaller than the diameters of the primary side resonance coil 13 and the secondary side resonance coil 14. FIG. 1B shows the relationship between the primary coil 12 and the primary side resonance coil 13. As shown in FIG. 1B, the primary coil 12 and the primary side resonance coil 13 are structured and arranged so as to form a single continuous spiral having the constant winding pitch P when viewed in the axial direction. Both ends of the primary coil 12 and both ends of the primary side resonance coil 13 are arranged along the radial direction of the spiral. The primary coil 12 is connected to the AC power source 11 at both ends, and the secondary coil 15 is connected to the load 16 at both ends. Also, the capacitors 17, 18 are connected to the ends of the primary side resonance coil 13 and the secondary side resonance coil 14, respectively.

The primary coil 12, the primary side resonance coil 13, the secondary side resonance coil 14, and the secondary coil 15 are supported by flat plate-like or flat frame-like support members 24, 25, 26, 27, respectively, so as to be coaxial. The support member 25 of the primary side resonance coil 13 and the support member 26 of the secondary side resonance coil 14 are each independently supported by non-illustrated guide member (for example, a guide shaft) to be movable in the axial direction. The distance changing devices 20, 21, for example, include motors 28, 29, screw shafts 30a, 31a rotated by the motors 28, 29, and nut members 30b, 31b screwed to the screw shafts 30a, 31a. The nut members 30b, 31b are fixed to the support members 25, 26. When the motors 28, 29 are driven, the nut members 30b, 31b causes the primary side resonance coil 13 and the secondary side resonance coil 14 to move together with the support members 25, 26, respectively.

The controller 23 includes a CPU 32 and a memory 33. The memory 33 stores a load calculation program for calculating the impedance of the load 16 connected to the secondary coil 15 based on the measurement result of the input impedance of the resonance system 19 obtained by the impedance measuring device 22. That is, the impedance measuring device 22 indirectly measures the impedance of the load 16. Further, the memory 33 stores, as a map or a relational expression, data representing the relationship between the impedance of the load 16 and the distances L1, L2 that are required for maximizing the power transmission efficiency (efficiency) at the impedance. The data is obtained through experiments in advance. The power transmission efficiency η is obtained using the following expression.

The power transmission efficiency η=(the power consumption at the load 16/the input power to the primary coil 12)×100 [%]

The CPU 32 calculates the impedance of the load 16 based on the measurement result of the impedance measuring device 22, and sets the first and second distances L1, L2 suitable for the state of the calculated impedance. The CPU 32 controls the distance changing devices 20, 21 so as to adjust the distances L1, L2 to the set distances.

The non-contact power transmission apparatus 10 is used in a system that contactlessly charges a secondary battery 41 mounted on a movable body (for example, a vehicle) 40. FIG. 2 schematically shows a charging device 43 of the system and the movable body 40. The secondary side resonance coil 14, the secondary coil 15, a rectifier circuit 44, the secondary battery 41 as the load 16, the distance changing device 21, and the controller 42 are mounted on the movable body 40. The controller 42 controls the distance changing device 21. The AC power source 11, the primary coil 12, the primary side resonance coil 13, the distance changing device 20, the impedance measuring device 22, and the controller 23 (primary side controller) are provided in the charging device 43, which contactlessly charges the secondary battery 41. The charging device 43 is installed in a charging station. The secondary side controller 42 receives the data of the proper second distance L2 from the controller 23, that is, from the primary side controller 23, through a non-illustrated wireless communication device, and controls the distance changing device 21 based on the received data. That is, the CPU 32 of the controller 23 indirectly controls the distance changing device 21 through the secondary side controller 42.

Figure 3:
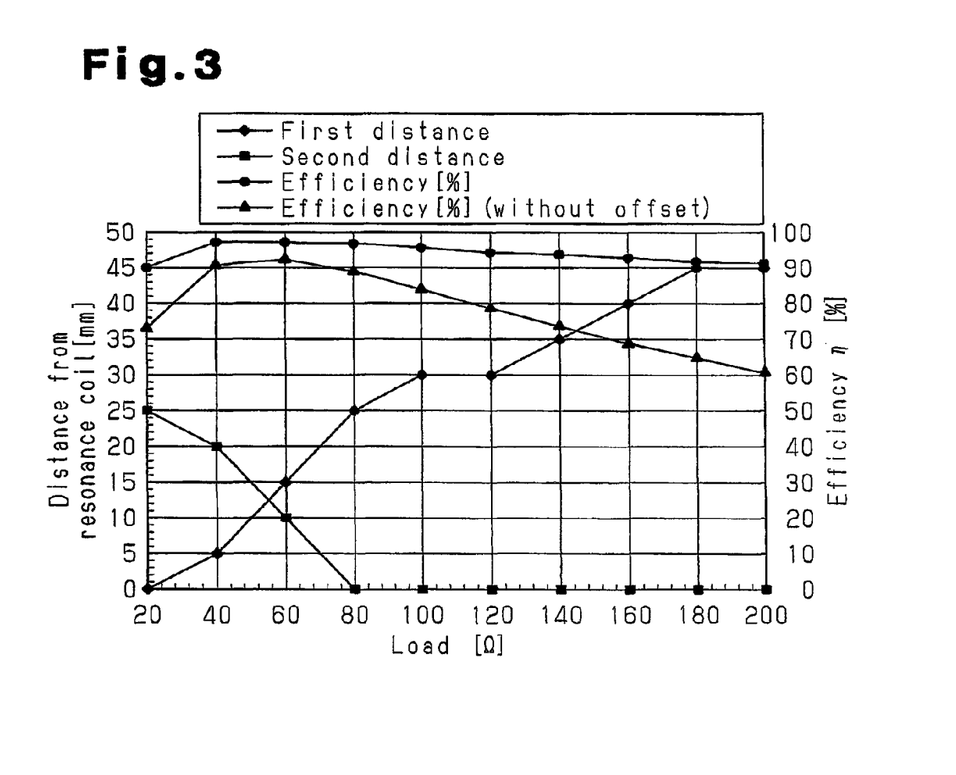
FIG. 3 is a graph showing the relationship between the distance between the primary coil (secondary coil) and the primary side resonance coil (secondary side resonance coil), the load, and the power transmission efficiency.

In FIG. 3, the distance between the primary side resonance coil 13 and the secondary side resonance coil 14 is set based on a reference state in which the power transmission efficiency η is maximized when the impedance of the load 16 is 50Ω, and the frequency of the input voltage from the AC power source 11 to the primary coil 12 is approximately 10 MHz. FIG. 3 shows one example of the relationship between the distances L1, L2 that maximize the power transmission efficiency and the impedance of the load 16 when the impedance of the load 16 is changed from the reference state. In FIG. 3, filled circles show the power transmission efficiency when the distances L1, L2 are adjusted, and filled triangles show the power transmission efficiency when the distances L1, L2 are maintained at 0 mm (a case without offset). As wires for forming coils in the resonance system 19, copper wires having a diameter of 3 mm are used. As the primary coil 12 and the secondary coil 15, coils having a radius r1 of approximately 120 mm (shown in FIG. 1B) are used. As the primary side resonance coil 13 and the secondary side resonance coil 14, coils having a radius r2 of approximately 150 mm (shown in FIG. 1B) are used.

An operation of the non-contact power transmission apparatus 10 thus constructed will now be described.

When the secondary battery 41 mounted on the movable body 40 needs to be charged, the movable body 40 is stopped at a position corresponding to the charging device 43, so that the secondary battery 41 can be charged by the charging device 43. The secondary battery 41 is charged with the movable body 40 stopped at a predetermined charging position where the distance between the movable body 40 and the charging device 43 is a predetermined value. The stopping position (charging position) is determined such that the power transmission efficiency is maximized when the impedance of the load 16, that is, the impedance of the secondary battery 41, which is the load during charging, is 50Ω.

When the movable body 40 is stopped at the charging position, the AC power source 11 outputs an AC voltage having a predetermined frequency to the primary coil 12, so that a magnetic field is generated at the primary coil 12. The magnetic field generated at the primary coil 12 is enhanced by magnetic field resonance of the primary side resonance coil 13 and the secondary side resonance coil 14, and the electromagnetic induction of the enhanced magnetic field of the secondary side resonance coil 14 generates power at the secondary coil 15. The generated power is supplied to the secondary battery 41 through the rectifier circuit 44.

Before and during charging of the secondary battery 41, the impedance measuring device 22 measures the input impedance of the resonance system 19 and sends the measurement result to the primary side controller 23. Based on the measurement result of the input impedance, the CPU 32 calculates the proper distances L1, L2 that correspond to the impedance of the secondary battery 41. The CPU 32 outputs control signals to the distance changing devices 20, 21 so that the distance changing devices 20, 21 adjust the first and second distances L1, L2 to proper distances corresponding to the impedance of the secondary battery 41. Therefore, even if the impedance of the secondary battery 41 changes during charging of the secondary battery 41, power is transmitted to the secondary battery 41 with proper efficiency.

In a case where the impedance of the load 16 changes (fluctuates) from 20Ω to 200Ω, if the distances L1, L2 is set to 0 mm regardless of the impedance of the load 16, the power transmission efficiency was greater than or equal to 90% in a range where the impedance of the load 16 is between 40Ω and 76Ω as shown by filled triangles in FIG. 3. However, the power transmission efficiency is less than 90% outside the range, 73% when the impedance is 20Ω, and 61% when the impedance is 200Ω. In contrast, in a case where the distances L1, L2 are adjusted in accordance with fluctuation of the impedance of the load 16, the power transmission efficiency is minimum at 90% when the impedance of the load 16 is 20Ω as shown by filled circles in FIG. 3. The power transmission efficiency is greater than or equal to 94% when the impedance is in the range between 32Ω to 140Ω, and the power transmission efficiency is greater than 91% even if the impedance 200Ω.

The present embodiment provides the following advantages.

(1) The non-contact power transmission apparatus 10 includes the AC power source 11, the primary coil 12 connected to the AC power source 11, the primary side resonance coil 13, the secondary side resonance coil 14, the secondary coil 15, and the load 16 connected to the secondary coil 15. The primary coil 12, the primary side resonance coil 13, the secondary side resonance coil 14, the secondary coil 15, and the load 16 form the resonance system 19. At least one of the first distance L1 and the second distance L2 is adjusted such that the power transmission efficiency is maximized in accordance with fluctuation of the impedance of the load 16. Therefore, even if the impedance of the load 16 changes, the power is transmitted to the load 16 with proper efficiency without changing the frequency of the AC voltage of the AC power source 11.

(2) The impedance measuring device 22, which indirectly measures the impedance of the load 16, the distance changing device 20, which changes the first distance L1, and the distance changing device 21, which changes the second distance L2, are provided. Based on the measurement result of the impedance measuring device 22, the primary side controller 23 calculates the distances L1, L2 suitable for the impedance of the load 16. When the impedance of the load 16, which is connected to the secondary coil 15, changes during power transmission from the AC power source 11, the distance changing devices 20, 21 automatically change the distances L1, L2 in accordance with the impedance of the load 16. Therefore, even if the impedance of the load 16 fluctuates, the power is transmitted to the load 16 with proper efficiency without changing the frequency of the AC voltage of the AC power source 11.

(3) The distance changing devices 20, 21 move at least one of the primary side resonance coil 13 and the secondary side resonance coil 14, thereby changing the distances L1, L2. Therefore, compared to a configuration in which the primary coil 12 connected to the AC power source 11 or the secondary coil 15 connected to the load 16 is moved, the structure for changing the distances L1, l2 is simplified.

(4) The non-contact power transmission apparatus 10 is used in a system that contactlessly charges the secondary battery 41 mounted on the movable body 40. The impedance measuring device 22, which measures the impedance of the load 16, is provided not in the movable body 40, but in the charging device 43, which is used by a number of movable bodies 40. Thus, the impedance measuring device 22 does not need to be provided in each movable body 40.

(5) The secondary side resonance coil 14 and the secondary coil 15 are mounted on the movable body 40, and the secondary coil 15 is connected to the secondary battery 41 as the load 16. The AC power source 11, the primary coil 12, and the primary side resonance coil 13 are provided in the charging device 43, which contactlessly charges the secondary battery 41. The charging device 43 uses the primary side controller 23 to detect the charging state of the secondary battery 41, and control the charging to the secondary battery 41. Therefore, when the secondary battery 41 is charged, insufficient or excessive charging can be avoided.

(6) The CPU 32 calculates the impedance of the secondary battery 41, which is the load 16 connected to the secondary coil 15, based on the measurement result of the impedance measuring device 22. Therefore, no dedicated sensor is needed for detecting the charging state of the secondary battery 41. Further, the impedance of the load 16 on the reception side can be measured from the transmission side.

A second embodiment of the present invention will now be described with reference to FIG. 4. This embodiment is different from the first embodiment in that, not only the components forming the transmission side of the non-contact power transmission apparatus 10, but also the components forming the reception side are not mounted on the movable body 40, and that multiple types of load having constant but different impedances are used as the load 16. One of the multiple loads is selected and connected to the secondary coil 15 in accordance with the intended use. Like or the same reference numerals are given to those components that are like or the same as the corresponding components of the first embodiment and detailed explanations are omitted.

Figure 4:
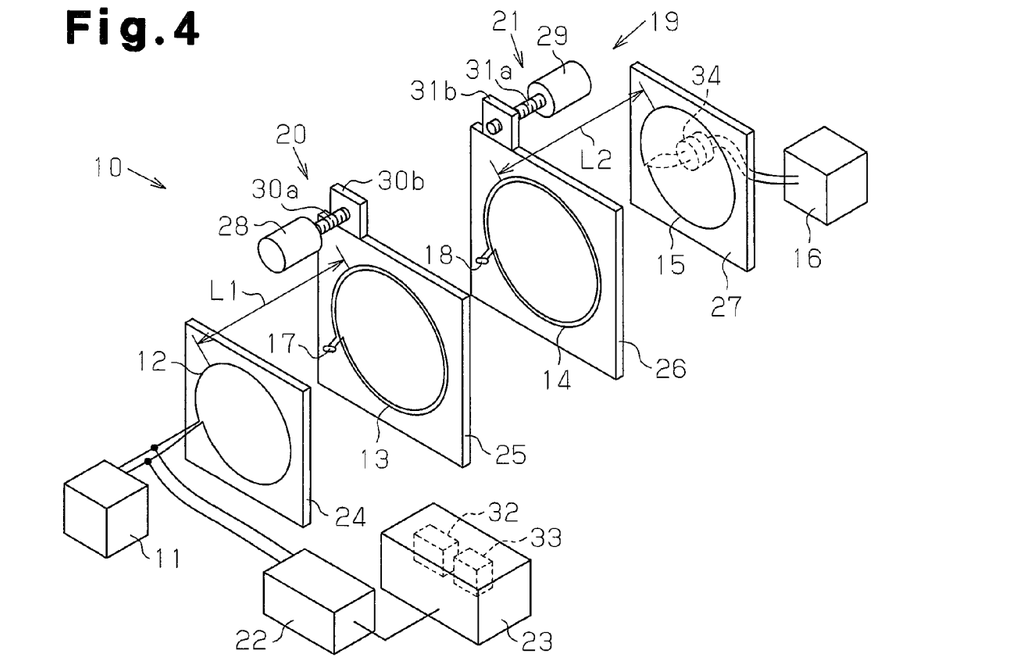
FIG. 4 is an exploded perspective view illustrating a non-contact power transmission apparatus according to a second embodiment of the present invention.

As shown in FIG. 4, the secondary coil 15 is connectable to an electrical device as the load 16 with a connector 34 in between. The memory 33 stores a program for calculating the distances L1, L2. When the load 16 is connected to the secondary coil 15, the CPU 32 calculates the distances L1, L2 that allow power to be transmitted to the load 16 with proper efficiency according to the program in the memory 33 based on the impedance of the load 16 measured by the impedance measuring device 22.

In the present embodiment, when the load 16 is connected to the secondary coil 15, the distances L1, L2 for transmitting power from the AC power source 11 to the load 16 with proper efficiency are calculated. The distance changing devices 20, 21 move the primary side and secondary side resonance coils 13, 14 to proper positions. Then, an AC voltage is output from the AC power source 11 at a constant frequency to carry out power transmission.

In addition to the advantages (1) and (3) of the first embodiment, the second embodiment has the following advantages.

(7) As the load 16, a number of types of loads having constant but different impedances are used. When the load 16 is connected to the secondary coil 15, the distance changing devices 20, 21 adjust at least one of the distances L1, L2 in accordance with the impedance of the connected load 16 to a value that allows power to be transmitted to the load 16 with proper efficiency. Thus, even if a load 16 having a different impedance is used, power can be transmitted to the load 16 with proper efficiency without changing the frequency of the AC voltage of the AC power source 11 and without measuring the impedance of the load 16 during the power transmission.

The above described embodiments may be modified as follows.

The present invention is not limited to the configuration in which the diameters of the primary coil 12 and the secondary coil 15 are smaller than the diameters of the primary side resonance coil 13 and the secondary side resonance coil 14. For example, the diameter of the primary coil 12 may be smaller than the diameter of the primary side resonance coil 13, and the diameter of the secondary coil 15 may be greater than the diameter of the secondary side resonance coil 14. Also, the diameter of the primary coil 12 may be greater than the diameter of the primary side resonance coil 13, and the diameter of the secondary coil 15 may be smaller than the diameter of the secondary side resonance coil 14. Alternatively, the diameters of the primary coil 12 and the secondary coil 15 may be greater than the diameters of the primary side resonance coil 13 and the secondary side resonance coil 14. Also, the diameters of the primary coil 12 and the secondary coil 15 may be equal to the diameters of the primary side resonance coil 13 and the secondary side resonance coil 14.

Figure 5:
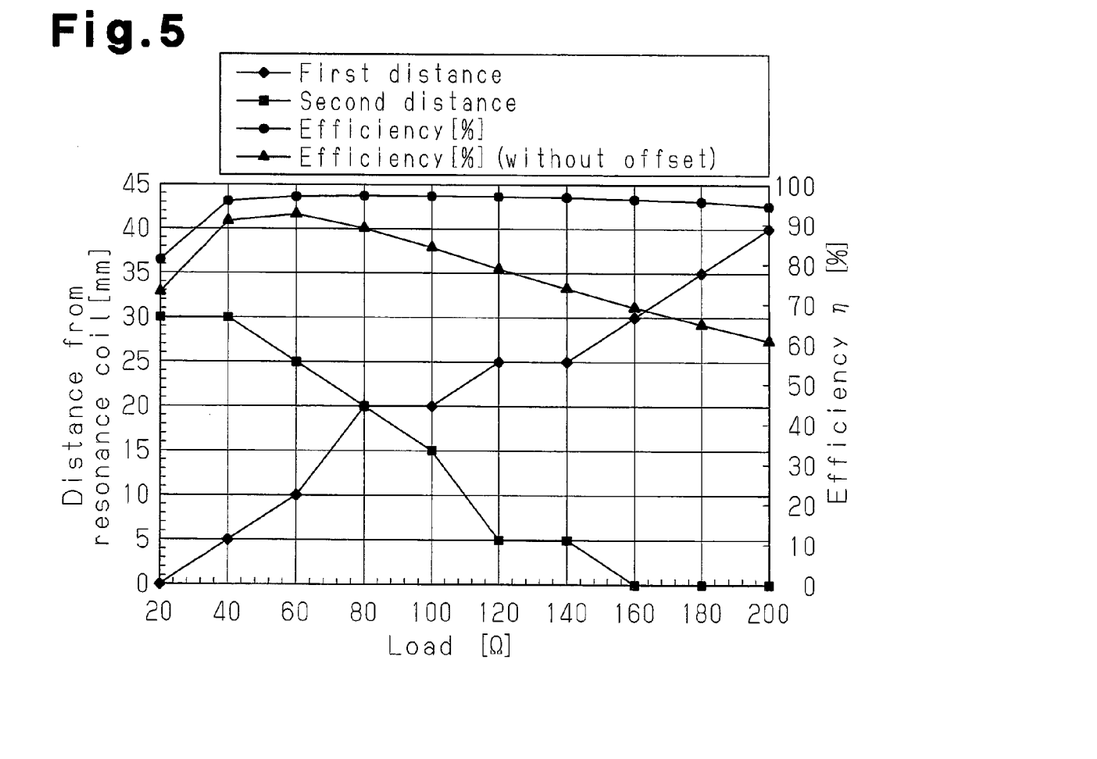
FIG. 5 is a graph showing the relationship between the distance between the primary coil (secondary coil) and the primary side resonance coil (secondary side resonance coil), the load, and the power transmission efficiency according to a modification.
Figure 6:
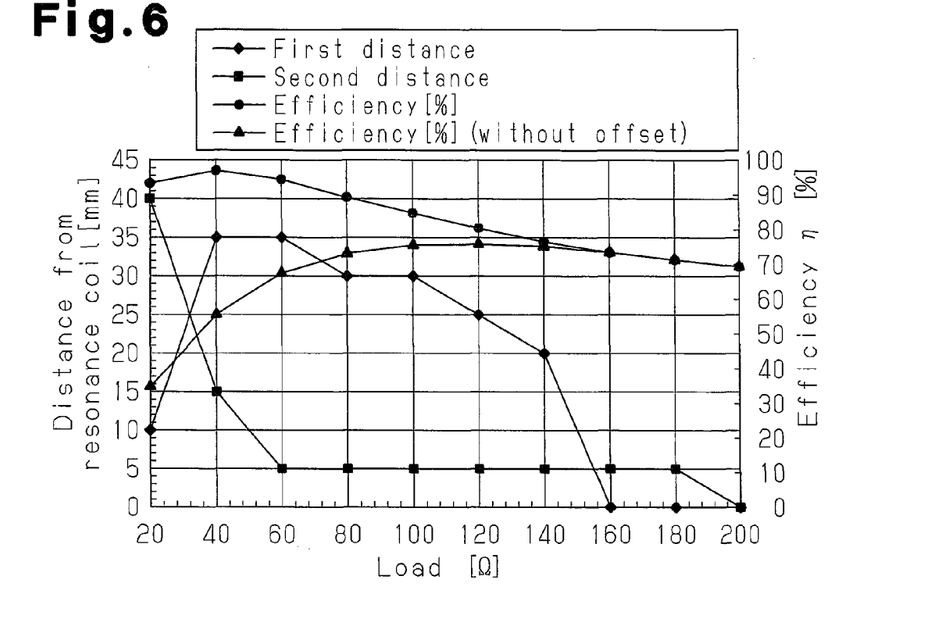
FIG. 6 is a graph showing the relationship between the distance between the primary coil (secondary coil) and the primary side resonance coil (secondary side resonance coil), the load, and the power transmission efficiency according to a modification.
Figure 7:
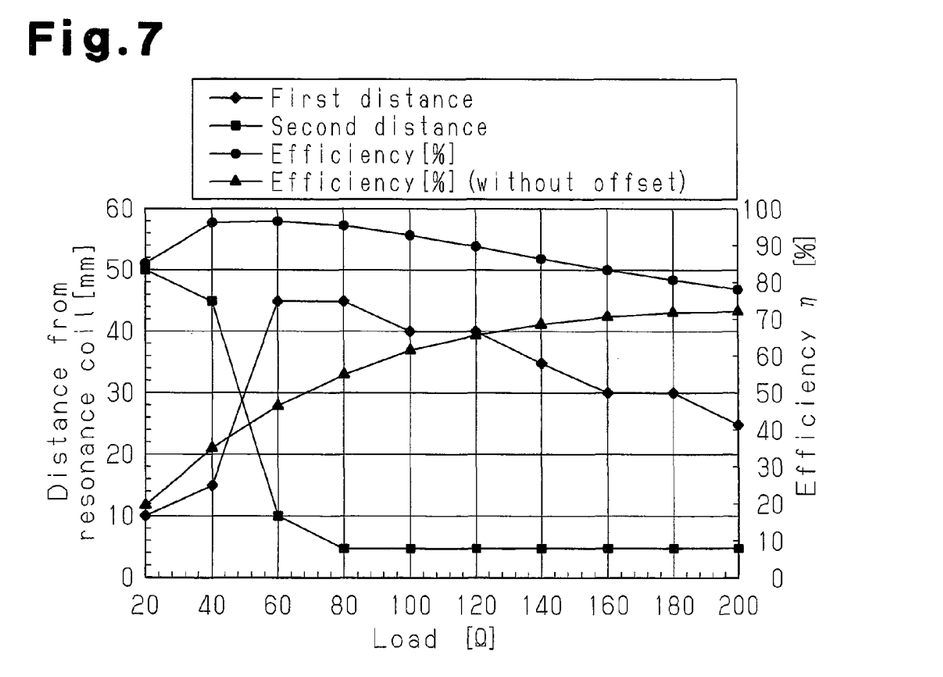
FIG. 7 is a graph showing the relationship between the distance between the primary coil (secondary coil) and the primary side resonance coil (secondary side resonance coil), the load, and the power transmission efficiency according to a modification.

FIG. 5 shows the relationship between the first distance, the second distance, the load, and the power transmission efficiency in a case where the diameter of the primary coil 12 is smaller than the diameter of the primary side resonance coil 13, and the diameter of the secondary coil 15 is greater than the diameter of the secondary side resonance coil 14. Also, FIG. 6 shows the relationship between the first distance, the second distance, the load, and the power transmission efficiency in a case where the diameter of the primary coil 12 is greater than the diameter of the primary side resonance coil 13, and the diameter of the secondary coil 15 is smaller than the diameter of the secondary side resonance coil 14. Further, FIG. 7 shows the relationship between the first distance, the second distance, the load, and the power transmission efficiency in a case where the diameter of the primary coil 12 and the diameter of the secondary coil 15 are greater than the diameter of the primary side resonance coil 13 and the diameter of the secondary side resonance coil 14. In FIGS. 5 to 7, the graph of filled circles shows the power transmission efficiency when the distances L1, L2 are adjusted, and the graph of filled triangles shows the power transmission efficiency when the distances L1, L2 are maintained at 0 mm (a case without offset).

As shown in FIGS. 3 and 5, when the diameter of the primary coil 12 is smaller than the diameter of the primary side resonance coil 13, the distance L1 at which the power transmission efficiency is maximized monotonically increases in accordance with increase of the impedance of the load 16. However, as shown in FIGS. 6 and 7, when the diameter of the primary coil 12 is greater than the diameter of the primary side resonance coil 13, the distance L1 at which the power transmission efficiency is maximized does not monotonically increase in accordance with increase of the impedance of the load 16, but has a peak. On the other hand, in the case of the secondary coil 15, even if the diameter of the secondary coil 15 is greater than or smaller than the diameter of the secondary side resonance coil 14, the second distance L2 at which the power transmission efficiency is maximized monotonically decreases in accordance with increase of the impedance of the load 16. When the impedance of the load 16 is at least greater than 80Ω, the first distance L1 is greater than the second distance L2 regardless the magnitude relation between the primary coil 12 and the secondary coil 15.

Also, when the diameter of the primary coil 12 is smaller than the diameter of the primary side resonance coil 13, the power transmission efficiency can be maintained above 90% in a wider range of the impedance of the load 16, compared to a case where the diameter of the primary coil 12 is greater than the diameter of the primary side resonance coil 13.

The first and second distances L1, L2 do not need to be set to maximize the power transmission efficiency in relation to the impedance of the load 16, as long as the distances L1, L2 are adjusted to values that make the power transmission efficiency be proper values by the distance changing devices 20, 21. In this description, "proper values of power transmission efficiency" refer to values with which the power transmission efficiency is at least 90% of the maximum value for the impedance of the load 16.

When the first distance L1 and the second distance L2 are changed, the distance changing devices 20, 21 may change the positions of the primary coil 12 and the secondary coil 15 without changing the positions of the primary side resonance coil 13 and the secondary side resonance coil 14.

When the present invention is applied to a system for charging the movable body 40 having the secondary battery 41, the movable body 40 is not limited to a vehicle or an automated guided vehicle, but may be a self-propelled robot or a portable electronic device having the secondary battery 41. In the case of a portable electronic device, it may be configured that only the first distance L1 is changed without changing the second distance L2, so as to reduce the size. For example, in a case where the fluctuation range of the impedance of the load 16 is from 80Ω to 200Ω, if the diameters of the primary coil 12 and the secondary coil 15 are smaller than the diameters of the primary side resonance coil 13 and the secondary side resonance coil 14, respectively, the power transmission efficiency is maintained greater than or equal to 92% even if the load 16 fluctuates as shown in FIG. 3, without providing the distance changing device 21.

The non-contact power transmission apparatus 10 may be used in an apparatus that has as the load 16 a plurality of motors, which are driven by a constant power and have different rated powers, and is moved to a specified working position by transporting means such as a conveyor belt driven by normal electricity without being contactlessly supplied with power as a power source. In this case, each motor serves as the load 16, and the transporting means has, in correspondence with each load 16, a secondary side resonance coil 14, a secondary coil 15, and a distance changing device 21. The AC power source 11, the primary coil 12, the primary side resonance coil 13, the distance changing device 20, and the primary side controller 23 are provided at the working position. When the load 16 is moved to the working position, the distances L1, L2 are adjusted to values that correspond to the load 16 before power transmission from the AC power source 11 is started.

As a configuration in which the primary coil 12, the primary side resonance coil 13, the secondary side resonance coil 14, and the secondary coil 15 are arranged coaxially, the coils 12, 13, 14, 15 may be arranged along an axis extending vertically instead of along an axis extending horizontally. In a case where the components of the secondary side (reception side) of the non-contact power transmission apparatus 10 are mounted on the movable body 40, the components of the primary side (transmission side) are arranged above the stopping position of the movable body 40 (for example, on the ceiling) or below the stopping position (for example, in the floor or a recess in the ground).

In place of the configuration in which the impedance measuring device 22 measures the input impedance of the resonance system 19, thereby indirectly measuring the impedance of the load 16, an impedance measuring device 22 that directly measures the impedance of the load 16 may be employed. In this case, the impedance measuring device 22 is provided on the reception side (the secondary side). The measurement result of the impedance measuring device 22 is sent to the primary side controller 23 by a wireless device.

In a case where an electrical device the impedance of which changes stepwise during the use of the non-contact power transmission apparatus 10 is used as the load 16, if times at which the impedance of the load 16 changes are determined in advance, the distances L1, L2 may be adjusted according to the elapsed period from when the load 16 starts operating (when the power transmission by the non-contact power transmission apparatus 10 is started).

The standardized numbers of turns and diameters of the primary coil 12, the primary side resonance coil 13, the secondary side resonance coil 14, and the secondary coil 15 are not limited to the values presented in the above described embodiments, but may be determined in accordance with the magnitude of the power to be transmitted to the load 16.

The primary coil 12, the primary side resonance coil 13, the secondary side resonance coil 14, and the secondary coil 15 do not need to be formed by spirally winding a wire on a single plane, but may be formed by cylindrically winding a wire like a coil spring.

The outer shapes of the primary coil 12, the primary side resonance coil 13, the secondary side resonance coil 14, and the secondary coil 15 do not need to be circular, but may be polygonal such as rectangular, hexagonal, or triangular, or may be elliptic.

The outer shapes of the primary coil 12, the primary side resonance coil 13, the secondary side resonance coil 14, and the secondary coil 15 do not need to be bilaterally symmetrical, but may be asymmetrical.

The capacitors 17, 18 connected to the primary side resonance coil 13 and the secondary side resonance coil 14 may be omitted. However, compared to the case where the capacitors 17, 18 are omitted, the configuration in which the capacitors 17, 18 are connected to the primary side resonance coil 13 and the secondary side resonance coil 14, respectively, lowers the resonance frequency. If the resonance frequency is the same, the configuration with the capacitors 17, 18 allows the primary side resonance coil 13 and the secondary side resonance coil 14 to be reduced in size.

The AC power source 11 may be configured such that the frequency of the AC voltage is either variable or invariable.

The wires are not limited to common copper wires having a circular cross section, but may be flat copper wires having a rectangular cross section.

The material for the wires do not need to be copper, but may be aluminum or silver.

What is claimed:

1. A non-contact power transmission apparatus having an AC power source and a resonance system, the resonance system having a primary coil connected to the AC power source, a primary side resonance coil, a secondary side resonance coil, a secondary coil, and a load connected to the secondary coil, wherein the primary side resonance coil is separated from the primary coil in an axial direction by a first distance, and the secondary coil is separated from the secondary side resonance coil in the axial direction by a second distance, wherein at least one of the first distance and the second distance is adjusted to be a distance that is determined in advance in accordance with the impedance of the load so that the power transmission efficiency is maintained at a proper value in accordance with change of the impedance of the load.

2. The apparatus according to claim 1, further comprising:
   an impedance measuring section that measures the impedance of the load; and
   a distance changing section that changes at least one of the first distance and the second distance based on a measurement result of the impedance measuring section.

3. The apparatus according to claim 1, wherein the load is a selected one of a plurality of loads having constant but different impedances, and
   the apparatus further comprising a distance changing section that changes at least one of the first distance and the second distance in accordance with the impedance of the selected load.

4. The apparatus according to claim 2, wherein the distance changing section moves at least one of the primary side resonance coil and the secondary side resonance coil, thereby changing at least one of the first and second distances.

5. The apparatus according to claim 3, wherein the distance changing section moves at least one of the primary side resonance coil and the secondary side resonance coil, thereby changing at least one of the first and second distances.

6. The apparatus according to claim 1, wherein the secondary side resonance coil and the secondary coil are mounted on a movable body,
   wherein the load is a secondary battery,
   the apparatus further comprising a charging device that contactlessly charges the secondary battery, wherein the AC power source, the primary coil, and the primary side resonance coil are provided in the charging device.

7. The apparatus according to claim 1, wherein the primary coil and the primary side resonance coil are circular, and
wherein the diameter of the primary coil is greater than the diameter of the primary side resonance coil.

8. The apparatus according to claim 2, wherein the distance changing section is a first distance changing section that changes the first distance, the apparatus further comprising a second distance changing section that changes the second distance,
wherein the secondary side resonance coil, the secondary coil, the load, and the second distance changing section are mounted on a movable body,
wherein the load is a secondary battery,
the apparatus further comprising a charging device that contactlessly charges the secondary battery,
wherein the AC power source, the primary coil, the primary side resonance coil, the impedance measuring section, and the first distance changing section are provided in the charging device.

* * * * *